US008867635B1

(12) United States Patent
Lee et al.

(10) Patent No.: US 8,867,635 B1
(45) Date of Patent: *Oct. 21, 2014

(54) GENERALIZED CO-PHASING FOR MULTIPLE TRANSMITTING AND RECEIVING ANTENNAS

(75) Inventors: Jungwon Lee, San Diego, CA (US);
Rohit U. Nabar, Santa Clara, CA (US);
Jihwan P. Choi, San Jose, CA (US);
Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 324 days.

This patent is subject to a terminal disclaimer.

(21) Appl. No.: 13/323,781

(22) Filed: Dec. 12, 2011

Related U.S. Application Data

(63) Continuation of application No. 12/098,924, filed on Apr. 7, 2008, now Pat. No. 8,077,785.

(60) Provisional application No. 60/910,706, filed on Apr. 9, 2007, provisional application No. 60/992,882, filed on Dec. 6, 2007.

(51) Int. Cl.
*H04K 1/10* (2006.01)
*H04L 27/28* (2006.01)

(52) U.S. Cl.
USPC ........... 375/260; 375/267; 375/299; 375/347; 375/349; 455/500; 455/101

(58) Field of Classification Search
CPC .............. H04L 27/2647; H04L 5/0007; H04L 27/2657; H04L 27/2662; H04L 5/0048; H04L 1/0618; H04L 1/06; H04L 25/0204; H04B 7/0417; H04B 7/0669; H04B 7/0845; H04B 7/0854; H04B 7/0757; H04B 1/123; H04B 7/002; H04B 1/109; H04B 7/0617; H04B 7/0671; H04B 7/0413
USPC .......... 375/260, 267, 299, 347, 349; 455/500, 455/101

See application file for complete search history.

(56) References Cited

U.S. PATENT DOCUMENTS

| | | | |
|---|---|---|---|
| 6,192,256 B1 * | 2/2001 | Whinnett | 455/562.1 |
| 7,412,212 B2 | 8/2008 | Hottinen | |
| 8,077,785 B1 * | 12/2011 | Lee et al. | 375/260 |

OTHER PUBLICATIONS

Akhtar, Jabran et al, Spatial Multiplexing Over Correlated MIMO Channels With a Closed-Form Precoder, *IEEE Transactions on Wireless Communications*, vol. 4, No. 5, Sep. 2005, pp. 2400-2409.

Foschini, Gerard J., Layered Space-Time Architecture for Wireless Communication in a Fading Environment When Using Multi-Element Antennas, *Bell Labs Technical Journal*, Autumn 1996, pp. 41-59.

(Continued)

*Primary Examiner* — Phuong Phu

(57) ABSTRACT

A method for determining a phase of each of a plurality of transmitting antennas in a multiple input and multiple output (MIMO) communication system includes: calculating, for first and second ones of the plurality of transmitting antennas, a value based on first and second groups of channel gains, the first group including channel gains between the first transmitting antenna and each of a plurality of receiving antennas, the second group including channel gains between the second transmitting antenna and each of the plurality of receiving antennas; and determining the phase of each of the plurality of transmitting antennas based on at least the value.

20 Claims, 5 Drawing Sheets

(56) References Cited

OTHER PUBLICATIONS

Guey, Jiann-Ching et al., Signal Design for Transmitter Diversity Wireless Communication Systems Over Rayleigh Fading Channels, *IEEE*, 1996, pp. 136-140.

Lo, Titus K.Y., Maximum Ratio Transmission, *IEEE Transactions on Communications*, vol. 47, No. 10, Oct. 1999, pp. 1458-1461.

Tarokh, Vahid et al, Space-Time Block Codes from Orthogonal Designs, *IEEE Transactions on Information Theory*, vol. 45, No. 5, Jul. 1999, pp. 1456-1467.

Telatar, Emre, *Capacity of Multi-antenna Gaussian Channels*, Lucent Technologies, Bell Laboratories, Murray Hill, NJ, pp. 1-28.

Yu, Wei et al., Transmitter Optimization for the Multi-Antenna Downlink With Per-Antenna Power Constraints, *IEEE Transaction on Signal Processing*, 6(55), Jun. 2007, pp. 2646-2660.

Co-pending, co-assigned U.S. Appl. No. 11/447,762, filed Jun. 5, 2006, titled *System and Method for Producing Weighted Signals in a Diversity Communication System*, pp. 1-52.

* cited by examiner

GENERALIZED CO-PHASING FOR MULTIPLE TRANSMITTING AND RECEIVING ANTENNAS

CROSS-REFERENCE TO RELATED APPLICATIONS

This present disclosure is a continuation of U.S. application Ser. No. 12/098,924, filed on Apr. 7, 2008, now U.S. Pat. No. 8,077,785, which claims priority under 35 U.S.C. §119 (e) to U.S. Provisional Application No. 60/910,706, filed Apr. 9, 2007, and U.S. Provisional Application No. 60/992,882, filed Dec. 6, 2007, each of which is hereby incorporated by reference herein in its respective entirety.

FIELD OF THE INVENTION

This invention pertains in general to communication systems and methods and, more particularly, to communication systems and methods using multiple transmitting and receiving antennas.

BACKGROUND

Recently, there has been great interest in multiple input and multiple output (MIMO) systems, which use multiple antennas on both a transmitter side and a receiver side of a communication system to improve communication performance. The MIMO technique has been employed in a variety of communication systems and is included in IEEE standards 802.11 and 802.16. There is, therefore, a need for increasing the performance of MIMO systems.

Improving spatial diversity gain may provide improved communication performance in a MIMO system. For example, when data signals including the same data are respectively transmitted by the multiple transmitting antennas of the MIMO system, spatial diversity results. With the data signals transmitted over multiple spatially separated communications channels, loss of signal due to fade or inference may be reduced, and data signals respectively received by the multiple receiving antennas of the MIMO system may be constructively combined to retrieve the data. In other words, the MIMO system has spatial diversity gain.

Because there are multiple transmitting antennas and multiple receiving antennas in the MIMO system, a communication channel is established between each of the transmitting antennas and each of the receiving antennas. A channel matrix H may be used to represent the communication channels between the transmitting antennas and the receiving antennas. Each element $h_{i,j}$ in the channel matrix H denotes a channel gain of a communication channel between a $j^{th}$ one of the transmitting antennas and an $i^{th}$ one of the receiving antennas. Typically, the channel gain $h_{i,j}$ is a complex number having a magnitude and a phase. For example, for a signal at a certain frequency propagating through the communication channel having the channel gain $h_{i,j}$, the magnitude of the channel gain $h_{i,j}$ indicates how much the signal would be amplified or attenuated, and the phase of the channel gain $h_{i,j}$ indicates how much a phase of the signal would be changed.

An example method to increase the spatial diversity gain of the MIMO system is to determine a phase of each of the multiple transmitting antennas of the MIMO system, based on singular value decomposition (SVD) of the channel matrix H, where the SVD is a matrix factorization method in the art of linear algebra. However, in reality, each of the multiple transmitting antennas of the MIMO system may have a transmitting power constraint. In other words, the MIMO system may have per-antenna transmitting power constraints. When the SVD-based method is used to determine a phase of each of the transmitting antennas of the MIMO system that has per-antenna transmitting power constraints, the determined phase of each of the transmitting antennas may degrade performance of the MIMO system.

SUMMARY OF THE INVENTION

In accordance with the invention, there is provided a method for determining a phase of each of a plurality of transmitting antennas in a MIMO communication system, comprising: calculating, for first and second ones of the plurality of transmitting antennas, a value based on first and second groups of channel gains, the first group including channel gains between the first transmitting antenna and each of a plurality of receiving antennas, the second group including channel gains between the second transmitting antenna and each of the plurality of receiving antennas; and determining the phase of each of the plurality of transmitting antennas based on at least the value.

Also in accordance with the invention, there is provided a method for determining an adjustment phase for each of a plurality of data signals to be respectively transmitted by a plurality of transmitting antennas in a MIMO communication system, comprising: calculating, for first and second ones of the plurality of transmitting antennas, a value based on first and second groups of channel gains, the first group including channel gains between the first transmitting antenna and each of a plurality of receiving antennas, the second group including channel gains between the second transmitting antenna and each of the plurality of receiving antennas; and determining the adjustment phase for each of the plurality of data signals to be transmitted based on at least the value.

Further in accordance with the invention, there is provided an apparatus for determining a phase of each of a plurality of transmitting antennas in a MIMO communication system, comprising: means for calculating, for first and second ones of the plurality of transmitting antennas, a value based on first and second groups of channel gains, the first group including channel gains between the first transmitting antenna and each of a plurality of receiving antennas, the second group including channel gains between the second transmitting antenna and each of the plurality of receiving antennas; and means for determining the phase of each of the plurality of transmitting antennas based on at least the value.

Additionally in accordance with the invention, there is provided a communication system comprising: a plurality of transmitting antennas each configured to transmit a data signal, and to adjust a phase of the data signal by an adjustment phase; and a plurality of receiving antennas each configured to receive data signals respectively transmitted by the transmitting antennas; wherein the adjustment phase of each of the transmitting antennas is determined based on at least a value calculated for first and second ones of the plurality of transmitting antennas, the value being calculated based on first and second groups of channel gains, the first group including channel gains between the first transmitting antenna and each of the plurality of receiving antennas, the second group including channels gain between the second transmitting antenna and each of the plurality of receiving antennas.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
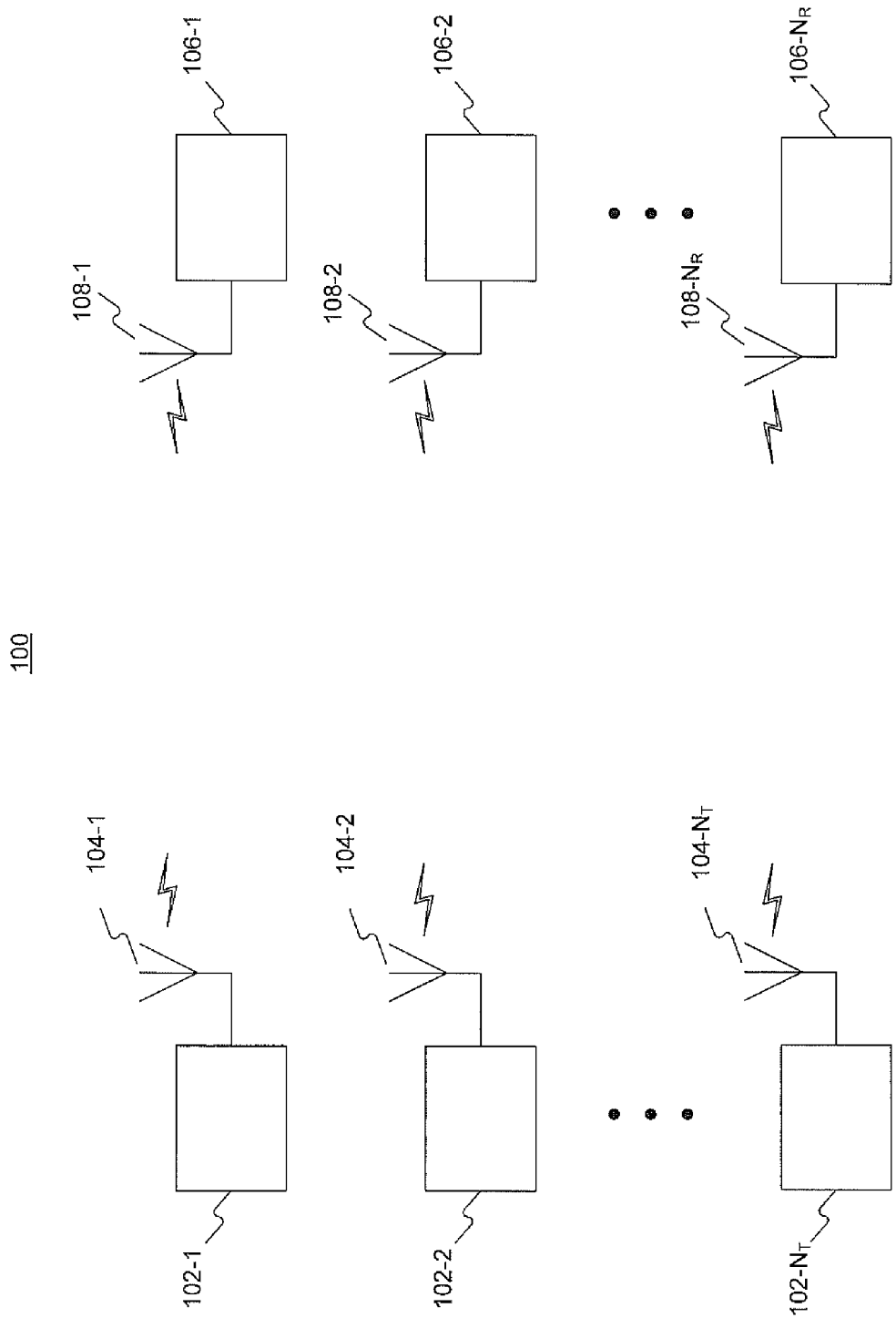
FIG. 1 illustrates a schematic block diagram of a MIMO system according to some embodiments of the present invention.

FIG. 1 illustrates a schematic block diagram of a MIMO system 100 according to some embodiments of the present invention. MIMO system 100 includes a plurality of transmitters 102-1, 102-2, . . . , 102-$N_T$ each having a transmitting antenna 104-1, 104-2, . . . , 104-$N_T$ ($N_T$ is the total number of the transmitters or transmitting antennas), and a plurality of receivers 106-1, 106-2, . . . , 106-$N_R$ each having a receiving antenna 108-1, 108-2, . . . , 108-$N_R$ ($N_R$ is the total number of the receivers or receiving antennas). The transmitting antennas 104-1, 104-2, . . . , 104-$N_T$ are configured to respectively have phases $\Theta_1, \Theta_2, \ldots, \Theta_{NT}$ which will be fully described below. An antenna having a phase may adjust a phase of a signal to be transmitted by the antenna based on the phase of the antenna. In other words, the phase of the antenna may be an adjustment phase for the signal to be transmitted by the antenna.

In some embodiments of the present invention, a communication channel is established between each of the transmitting antennas 104-1, 104-2, . . . , 104-$N_T$ and each of the receiving antennas 108-1, 108-2, . . . , 108-$N_R$. The established communication channels may be flat fading channels or frequency selective channels. When a signal is transmitted through a flat fading channel, all frequency components of the signal in a particular operating band are attenuated equally. When the signal is transmitted through a frequency selective channel, components of the signal at certain frequencies are passed. For example, when orthogonal frequency division multiplexing (OFDM) techniques are used in the MIMO system 100, the established communication channels may be frequency selective channels, although each sub-carrier may experience flat fading.

Solely for the purpose of explaining the exemplary embodiments, it is assumed that the established communication channels are flat fading channels. Each of the communication channels has a channel gain $h_{i,j}$ (i=1, 2, . . . , $N_R$; j=1, 2, . . . , $N_T$). For example, the communication channel with the channel gain $h_{1,1}$ is established between the transmitting antenna 104-1 and the receiving antenna 108-1. Also, for example, the communication channel with the channel gain $h_{2,N_T}$ is established between the transmitting antenna 104-$N_T$ and the receiving antenna 108-2. Typically, the channel gain $h_{i,j}$ is a complex number having a magnitude and a phase. For example, for a signal at a certain frequency propagating through the communication channel having the channel gain $h_{i,j}$, the magnitude of the channel gain $h_{i,j}$ may indicate how much the signal would be amplified or attenuated, and the phase of the channel gain $h_{i,j}$ may indicate how much a phase of the signal would be changed.

A channel matrix H can be used to represent the channel gains between the transmitting antennas 104-1, 104-2, . . . , 104-$N_T$ and the receiving antennas 108-1, 108-2, . . . , 108-$N_R$ as follows:

$$H = \begin{bmatrix} h_{1,1} & \cdots & h_{1,N_T} \\ \vdots & \ddots & \vdots \\ h_{N_R,1} & \cdots & h_{N_R,N_T} \end{bmatrix}. \quad \text{Equation (1)}$$

For convenience of illustration, the channel matrix H can be expressed as:

$$H = [h_1 \ldots h_{N_T}], \quad \text{Equation (2)}$$

where $h_t$ (t=1, 2, . . . , $N_1$) is a vector corresponding to the $t^{th}$ column of the channel matrix H.

In some embodiments of the present invention, each of the transmitting antennas 104-1, 104-2, . . . , 104-$N_T$ has a transmitting power constraint. For example, each of the transmitting antennas 104-1, 104-2, . . . , 104-$N_T$ has a maximum transmitting power P. Therefore, the transmitting antennas 104-1, 104-2, . . . , 104-$N_T$ may not amplify, but may make phase adjustment to data signals to be transmitted thereby. After the phase adjustment, the transmitting antennas 104-1, 104-2, . . . , 104-$N_T$ respectively transmit data signals $x_1, x_2, \ldots, x_{N_T}$ including the same data u. The transmitted data signals $x_1, x_2, \ldots, x_{N_T}$ can be denoted by a vector x as follows:

$$x = [x_1 \ldots x_{N_T}]^T, \quad \text{Equation (3)}$$

where "T" denotes matrix transposition. For convenience of illustration, the data u and signal components in the transmitted data signals $x_1, x_2, \ldots, x_{N_T}$ that may affect spatial diversity gain of the MIMO system 100 are used to represent the transmitted data signals $x_1, x_2, \ldots, x_N$, and Equation (3) is further expressed as follows:

$$x = \begin{bmatrix} e^{j\theta_1} & \ldots & e^{j\theta_{N_T}} \end{bmatrix}^T u, \quad \text{Equation (4)}$$

where j is an imaginary unit, and $\Theta_1, \Theta_2, \ldots, \Theta_{NT}$ are the phases of the transmitting antennas 104-1, 104-2, . . . , 104-$N_T$, respectively.

For example, the signal $x_1$ transmitted by the transmitting antenna 104-1 propagates through the communication channels with the channel gains $h_{1,1}, h_{2,1}, \ldots, h_{N_R,1}$, and is then received by each of the receiving antennas 108-1, 108-2, . . . , 108-$N_R$. Also, for example, the signal $x_{N_T}$ transmitted by the transmitting antenna 104-$N_T$ propagates through the communication channels with the channel gains $h_{1,N_T}$, $h_{2,N_T}$, ..., $h_{N_R,N_T}$, and is then received by each of the receiving antennas 108-1, 108-2, ..., 108-$N_R$.

A vector y may be used to denote signals $y_1, y_2, \ldots, y_{N_R}$ respectively received by the receiving antennas 108-1, 108-2, ..., 108-$N_R$ as follows:

$$y = [y_1 \ldots y_{N_R}]^T. \quad \text{Equation (5)}$$

The vector y containing the signals $y_1, y_2, \ldots, y_{N_R}$ can be further calculated as follows:

$$y = Hx + z, \quad \text{Equation (6)}$$

where H is the channel matrix, x is the vector containing the data signals $x_1, x_2, \ldots, x_{N_T}$ respectively transmitted by the transmitting antennas 104-1, 104-2, ..., 104-$N_T$, and z is a vector containing noise signals $z_1, z_2, \ldots, z_{N_R}$ respectively generated in the receiving antennas 108-1, 108-2, ..., 108-$N_R$, or $$z = [z_1 \ldots z_{N_R}]^T. \quad \text{Equation (7)}$$

Solely for the purpose of explaining the exemplary embodiments, it is assumed that each of the noise signals $z_1, z_2, \ldots, z_{N_R}$ is a Gaussian noise signal. A Gaussian noise signal has a probability density function of a normal distribution.

Based on Equations (2), (4), and (6), the vector y containing the signals $y_1, y_2, \ldots, y_{N_R}$ may be further calculated as follows:

$$y = \sum_{t=1}^{N_T} e^{j\theta_t} h_t u + z. \quad \text{Equation (8)}$$

In some embodiments of the present invention, an equivalent channel gain $H_e$ is defined as follows:

$$H_e = \sum_{t=1}^{N_T} e^{j\theta_t} h_t. \quad \text{Equation (9)}$$

The vector y containing the signals $y_1, y_2, \ldots, y_{N_R}$ may then be expressed as follows:

$$y = H_e u + z. \quad \text{Equation (10)}$$

The receiving antennas 108-1, 108-2, ..., 108-$N_R$ respectively receive the signals $y_1, y_2, \ldots, y_{N_R}$. The signals $y_1, y_2, \ldots, y_{N_R}$ are further processed based on, e.g., maximum ratio combining (MRC) techniques, to obtain a signal r for retrieving the data u as follows:

$$r = H^*_e y = \|H_e\|^2 u + \tilde{z}, \quad \text{Equation (11)}$$

where "*" denotes matrix conjugate transposition, "$\|H_e\|^2$" denotes a norm of the equivalent channel gain $H_e$ and is equal to $H^*_e H_e$, and $$\tilde{z} = H^*_e z. \quad \text{Equation (12)}$$

Therefore a signal to noise ratio (SNR) of the obtained signal r can be calculated as follows:

$$SNR = \frac{\|H_e\|^2 P}{\sigma_z^2}, \quad \text{Equation (13)}$$

where $\sigma_z^2$ is a variance of each individual noise signal $z_1, z_2, \ldots, z_{N_R}$, and P is the maximum transmitting power of each of the transmitting antennas 104-1, 104-2, ..., 104-$N_T$.

In some embodiments of the present invention, the spatial diversity gain of the MIMO system 100 and, hence, the SNR of the obtained signal r may be increased by using co-phasing methods. The co-phasing methods may determine the phase of each of the transmitting antennas 104-1, 104-2, ..., 104-$N_T$, or the adjustment phase for the data signal to be transmitted by each of the transmitting antennas 104-1, 104-2, ..., 104-$N_T$, such that data signals received by the receiving antennas 108-1, 108-2, ..., 108-$N_R$ may be constructively combined. Examples of co-phasing methods are fully described below.

A. Global Co-Phasing

Referring back to Equation (13), the SNR of the obtained signal r may be improved by maximizing the norm of the equivalent channel gain $H_e$. Based on Equation (9), the norm of the equivalent channel gain $H_e$ may be further expressed as follows:

$$\|H_e\|^2 = \sum_{t=1}^{N_T} \|h_t\|^2 + 2 \sum_{t=1}^{N_T} \sum_{k=t+1}^{N_T} R\{e^{-j(\theta_t - \theta_k)}(h_t^* h_k)\}, \quad \text{Equation (14)}$$

where $R\{e^{-j(\Theta_t - \Theta_k)}(h^*_t h_k)\}$ represents a real part of $e^{-j(\Theta_t - \Theta_k)}(h^*_t h_k)$.

The first term $$\sum_{t=1}^{N_T} \|h_t\|^2$$

on the right side of Equation (14) relates to the communication channel between each of the transmitting antennas 104-1, 104-2, ..., 104-$N_T$ and each of the receiving antennas 108-1, 108-2, ..., 108-$N_R$, and has a determined value once locations of the transmitting antennas 104-1, 104-2, ..., 104-$N_T$ and the receiving antennas 108-1, 108-2, ..., 108-$N_R$ are determined. The second term $$2 \sum_{t=1}^{N_T} \sum_{k=t+1}^{N_T} R\{e^{-j(\theta_t - \theta_k)}(h_t^* h_k)\}$$

on the right side of Equation (14) relates to the communication channel between each of the transmitting antennas 104-1, 104-2, ..., 104-$N_T$ and each of the receiving antennas 108-1, 108-2, ..., 108-$N_R$, and the phase $\Theta_1, \Theta_2, \ldots, \Theta_{NT}$ of each of the transmitting antennas 104-1, 104-2, ..., 104-$N_T$. In particular, the term $$2 \sum_{t=1}^{N_T} \sum_{k=t+1}^{N_T} R\{e^{-j(\theta_t - \theta_k)}(h_t^* h_k)\}$$

relates to a phase difference between each combination of any two of the transmitting antennas 104-1, 104-2, ..., 104-$N_T$.

In some embodiments of the present invention, a function $f(\Theta_1, \Theta_2, \ldots, \Theta_{NT})$ is defined for determining the phases $\Theta_1, \Theta_2, \ldots, \Theta_{NT}$ of the transmitting antennas 104-1, 104-2, ..., 104-$N_T$. The function $f(\Theta_1, \Theta_2, \ldots, \Theta_{NT})$ corresponds to the second term $$2\sum_{t=1}^{N_T}\sum_{k=t+1}^{N_T} R\{e^{-j(\theta_t-\theta_k)}(h_t^* h_k)\}$$

on the right side of Equation (14) and may be expressed as:

$$f(\theta_1, \theta_2, \ldots, \theta_{N_T}) = \sum_{t=1}^{N_T}\sum_{k=t+1}^{N_T} R\{e^{-j(\theta_t-\theta_k)}(h_t^* h_k)\}, \quad \text{Equation (15)}$$

where $0 \le \theta_j < 2\pi$ for $i=1, \ldots, N_T$. The SNR of the obtained signal r may be improved by determining the phases $\Theta_1, \Theta_2, \ldots, \Theta_{NT}$ such that the function $f(\Theta_1, \Theta_2, \ldots, \Theta_{NT})$ may be maximized. In particular, it is possible to maximize the function $f(\Theta_1, \Theta_2, \ldots, \Theta_{NT})$ if the following expressions, or constraints, are satisfied:

$$\theta_t-\theta_k=\angle(h_t^* h_k) \text{ for } t=1, \ldots, N_T-1, \text{ and } k=t+1, \ldots, N_T, \quad \text{Equation (16)}$$

where the value $h_t^* h_k$ is typically a complex number.

For example, the value $h_t^* h_k$, as the complex number, can be expressed as follows:

$$h_t^* h_k = A_{t,k} \cdot e^{j\phi_{t,k}}, \quad \text{Equation (17)}$$

where $A_{t,k}$ is a magnitude of $h_t^* h_k$ ($A_{t,k}=|h_t^* h_k|$), and $\phi_{t,kk}$ is a phase of $h_t^* h_k$ ($\phi_{t,k}=\angle(h_t^* h_k)$). For a given t and k, $$R\{e^{-j(\theta_t-\theta_k)}(h_t^* h_k)\} \le |e^{-j(\theta_t-\theta_k)}(h_t^* h_k)| = |e^{-j(\theta_t-\theta_k)}| (A_{t,k}\cdot e^{j\phi_{t,k}}) | \le A_{t,k}. \quad \text{Equation (18)}$$

Therefore, $R\{e^{-j(\theta_t-\theta_k)}(h_t^* h_k)\}$ and, hence, the function $f(\Theta_1, \Theta_2, \ldots, \Theta_{NT})$ may be maximized if $\phi_{t,k}=\theta_t-\theta_k$, i.e., Equation (16), is satisfied.

Each expression in Equation (16) corresponds to one value $h_t^* h_k$, which may be used to determine a phase difference between the transmitting antennas 104-t and 104-k. In addition, Equation (16) includes the value $h_t^* h_k$ for each combination of any two of the transmitting antennas 104-t and 104-k ($t=1, \ldots, N_T-1; k=t+1, \ldots, N_T$). The value $h_t^* h_k$ can be calculated based on first and second groups of channel gains respectively included in the vectors $h_t$ and $h_k$. The vector $h_t$ includes channel gains between the transmitting antenna 104-t and each of the receiving antennas 108-1, 108-2, ..., 108-$N_R$, and the vector $h_k$ includes channel gains between the transmitting antenna 104-k and each of the receiving antennas 108-1, 108-2, ..., 108-$N_R$.

There are $$\frac{N_T(N_T-1)}{2}$$

expressions in Equation (16). If the MIMO system 100 includes a total of two transmitting antennas 104-1 and 104-2, i.e., $N_T=2$, there is only one expression in Equation (16), which determines a phase difference between the two transmitting antennas 104-1 and 104-2. The phases of the transmitting antennas 104-1 and 104-2 may be determined by assigning a phase value to the phase of one of the transmitting antennas 104-1 and 104-2, and solving Equation (16) for the phase of the other one of the transmitting antennas 104-1 and 104-2.

Generally, all the expressions in Equation (16) may not be satisfied simultaneously. For example, for the MIMO system 100 having a total of four transmitting antennas 104-1, 104-2, 104-3, and 104-4, Equation (16) may be expressed as follows:

$$\theta_1-\theta_2=\angle(h_1^* h_2),$$

$$\theta_1-\theta_3=\angle(h_1^* h_3),$$

$$\theta_1-\theta_4=\angle(h_1^* h_4),$$

$$\theta_2-\theta_3=\angle(h_2^* h_3),$$

$$\theta_2-\theta_4=\angle(h_2^* h_4),$$

$$\theta_3-\theta_4=\angle(h_3^* h_4). \quad \text{Equation (19)}$$

Based on the first and second expressions in Equation (19), it follows that $$\theta_2-\theta_3=(\theta_1-\theta_3)-(\theta_1-\theta_2)=\angle(h_1^* h_3)-\angle(h_1^* h_2). \quad \text{Equation (20)}$$

However, Equation (19) also shows $\theta_2-\theta_3=\angle(h_2^* h_3)$. Since $\angle(h_1^* h_3)-\angle(h_1^* h_2)$ might not be equal to $\angle(h_2^* h_3)$, all the expressions in Equation (19) may not be satisfied simultaneously. Therefore, approximate methods may be used to determine the phase $\Theta_1, \Theta_2, \ldots, \Theta_{NT}$ of each of the transmitting antennas 104-1, 104-2, ..., 104-$N_T$ based on Equation (16).

Figure 2:
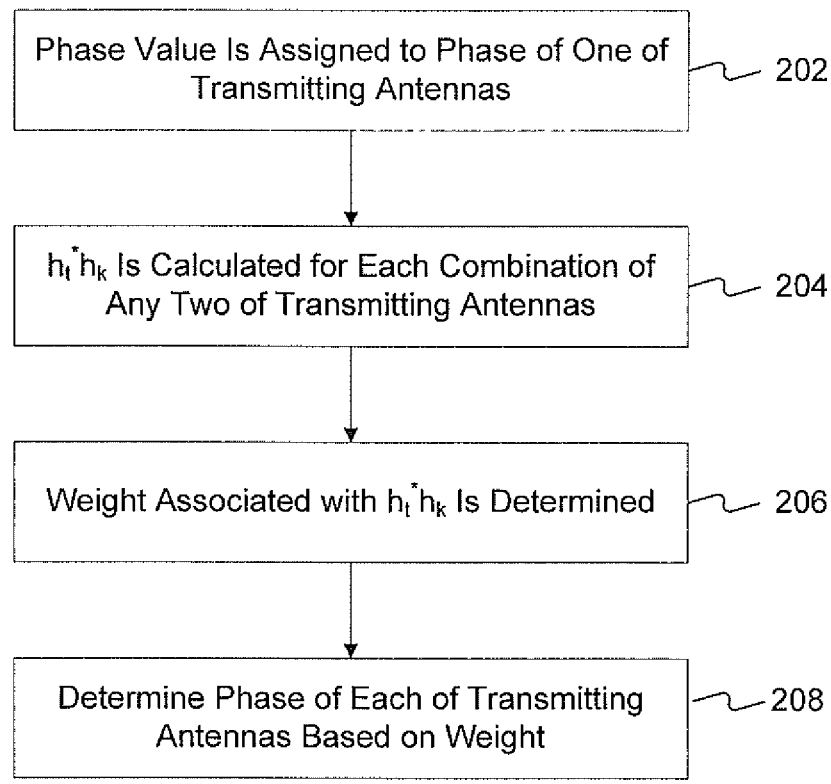
FIG. 2 illustrates a flowchart of a global co-phasing method to determine a phase of each of a plurality of transmitting antennas in a MIMO system according to some embodiments of the present invention.

FIG. 2 illustrates a flowchart of a global co-phasing method to determine the phase $\Theta_1, \Theta_2, \ldots, \Theta_{NT}$ of each of the transmitting antennas 104-1, 104-2, ..., 104-$N_T$ of the MIMO system 100, according to some embodiments of the present invention. For convenience of illustration, let $(t_p, k_p)$ denote the indices (t, k) in a $p^{th}$ expression in Equation (16). The expressions in Equation (16) are ordered such that the expressions start from the lowest number of t and then start from the lowest number of k for the same t. For example, for the MIMO system 100 having the four transmitting antennas 104-1, 104-2, 104-3, and 104-4, expressions in Equation (19) are ordered such that $(t_1, k_1)=(1, 2)$, $(t_2, k_2)=(1, 3)$, $(t_3, k_3)=(1, 4)$, $(t_4, k_4)=(2, 3)$, $(t_5, k_5)=(2, 4)$, and $(t_6, k_6)=(3, 4)$.

In accordance with a weighted least squares method, Equation (16) can be modified to be:

$$w_{t,k}(\theta_t-\theta_k-\angle(h_t^* h_k))\approx 0, \text{ for } t=1, \ldots, N_T-1, \text{ and } k=t+1, \ldots, N_T, \quad \text{Equation (21)}$$

where $w_{t,k}$ is a weight applied to the one of the expressions in Equation (16) having the indices (t, k) and the weight $w_{t,k}$ is associated with the value $h_t^* h_k$. Based on the weighted least squares method, an expression with a relatively large weight attached to it would be satisfied more accurately.

In addition, a phase value may be assigned to the phase of one of the transmitting antennas 104-1, 104-2, ..., 104-$N_T$ to provide an additional expression or constraint, such as $\theta_T=0$. Together with this constraint, Equation (21) may be formulated in matrix form as follows:

$$WA\begin{bmatrix}\theta_1\\ \theta_2\\ \vdots\\ \theta_{N_T}\end{bmatrix} = W\begin{bmatrix}\angle(h_{t_1}^* h_{k_1})\\ \vdots\\ \angle(h_{t_{g(N_T)}}^* h_{k_{g(N_T)}})\\ 0\end{bmatrix}, \quad \text{Equation (22)}$$

where A is a coefficient matrix and W is a weight matrix, and $$g(N_T) = \frac{N_T(N_T-1)}{2}.$$

For example, the coefficient matrix A may have a size of $(g(N_T)+1) \times N_T$. An element $a_{p,q}$ in the $p^{th}$ row and the $q^{th}$ column of the coefficient matrix A is:

$$a_{p,q} = \begin{cases} 1 & \text{for } q = t_p \text{ and } p \leq g(N_T) \text{ or} \\ & q = N_T \text{ and } p = g(N_T)+1 \\ -1 & \text{for } q = k_p \text{ and } p \leq g(N_T) \\ 0 & \text{otherwise} \end{cases} \quad \text{Equation (23)}$$

The weight matrix W may have a size of $(g(N_T)+1) \times (g(N_T)+1)$ and is a diagonal matrix including the weights $w_{t,k}$ ($t=1, \ldots, N_T-1; k=t+1, \ldots, N_T$), respectively, associated with the values $h^*_t h_k$ or the expressions in Equation (16).

Referring to FIG. 2, a phase value is assigned to the phase of one of the transmitting antennas 104-1, 104-2, ..., 104-$N_T$, as noted above (step 202). The assigned phase value may be equal to or greater than zero, and smaller than 2□. For example, in Equation (22) the phase $\theta_{N_T}$ of the transmitting antenna 104-$N_T$ is assigned a phase value zero. In addition, assigning the phase value to the phase of one of the transmitting antennas 104-1, 104-2, ..., 104-$N_T$ may make the coefficient matrix A a full-rank matrix.

In step 204, the value $h^*_t h_k$ is also calculated for each combination of any two of the transmitting antennas 104-1, 104-2, ..., 104-$N_T$. For example, the value $h^*_t h_k$ is calculated based on the first and second groups of channel gains respectively included in the vectors $h_t$ and $h_k$, as explained above. Typically, the calculated value $h^*_t h_k$ is a complex number. The phase $\angle h^*_t h_k$ of the calculated value $h^*_t H_k$ is further calculated to determine the phase $\Theta_1 \Theta_2, \ldots, \Theta_{NT}$ of each of the transmitting antennas 104-1, 104-2, ..., 104-$N_T$, as shown in Equation (22). In the illustrated embodiment shown in the FIG. 2, step 204 is performed after step 202. Alternatively, step 204 may be performed before step 202.

The weight $w_{t,k}$ associated with the value $h^*_t h_k$ calculated for each combination of any two of the transmitting antennas 104-1, 104-2, ..., 104-$N_T$ is further determined (step 206). For example, the weight $w_{t,k}$ associated with the value $h^*_t h_k$ calculated for a first combination of two of the transmitting antennas 104-1, 104-2, ..., 104-$N_T$ may be equal to that calculated for a second combination of two of the transmitting antennas 104-1, 104-2, ..., 104-$N_T$. If the weight $w_{t,k}$ is so determined, step 206 can be performed before or after any of the steps 202 and 204. Also, for example, the weight $w_{t,k}$ associated with the value $h^*_t h_k$ calculated for the two transmitting antennas 104-t and 104-k can be a magnitude or a squared magnitude of the value $h^*_t h_k$. Further, for example, the weight $w_{t,k}$ associated with the value $h^*_t h_k$ calculated for the two transmitting antennas 104-t and 104-k can be an exponential function of the squared magnitude of the value $h^*_t h_k$.

When the weight $w_{t,k}$ associated with the value $h^*_t h_k$ calculated for each combination of any two of the transmitting antennas 104-1, 104-2, ..., 104-$N_T$ is determined, the weight matrix W may be determined. For example, if the weight $w_{t,k}$ associated with the value $h^*_t h_k$ is a magnitude of the value $h^*_t h_k$, i.e., $|h^*_t h_k|$, the weight matrix W in Equation (22) may be determined as follows:

$$W = \begin{bmatrix} |h^*_{t_1} h_{k_1}| & 0 & 0 & 0 \\ 0 & \ddots & 0 & 0 \\ 0 & 0 & |h^*_{t_{g(N_T)}} h_{k_{g(N_T)}}| & 0 \\ 0 & 0 & 0 & w_0 \end{bmatrix}, \quad \text{Equation (24)}$$

where $w_0$ is a weight associated with the expression $\theta_T = 0$ and may be any nonzero real value.

After the weight matrix W is determined, a solution to Equation (22) can be expressed as follows:

$$\begin{bmatrix} \theta_1 \\ \theta_2 \\ \vdots \\ \theta_{N_T} \end{bmatrix} = (WA)^+ W \begin{bmatrix} \angle(h^*_{t_1} h_{k_1}) \\ \vdots \\ \angle(h^*_{t_{g(N_T)}} h_{k_{g(N_T)}}) \\ 0 \end{bmatrix}, \quad \text{Equation (25)}$$

where $(WA)^+$ is a pseudo-inverse of WA, or $$(WA)^+ = (A^T W^T WA)^{-1} A^T W^T, \quad \text{Equation (26)}$$

where $(A^T W^T WA)^{-1}$ denotes an inverse of $A^T W^T WA$. Thus, in step 208, the phase $\Theta_1 \Theta_2, \ldots, \Theta_{NT}$ of each of the transmitting antennas 104-1, 104-2, ..., 104-$N_T$ can be determined based on the weight matrix W.

B. Pairwise Co-Phasing

In some embodiments of the present invention, a pairwise co-phasing method may be used to determine the phase $\Theta_1$, $\Theta_2, \ldots, \Theta_{NT}$ of each of the transmitting antennas 104-1, 104-2, ..., 104-$N_T$. As noted above, there are $$\frac{N_T(N_T-1)}{2}$$

expressions in Equation (16), and each expression in Equation (16) corresponds to a value $h^*_t h_k$, which may be used to determine a phase difference between the transmitting antennas 104-t and 104-k. Generally, all the expressions in Equation (16) may not be satisfied simultaneously. Therefore, based on the pairwise co-phasing method, $N_T-1$ of the $$\frac{N_T(N_T-1)}{2}$$

expressions in Equation (16), respectively corresponding to $N_T-1$ of the $$\frac{N_T(N_T-1)}{2}$$

values $h^*_t h_k$ ($t=1, \ldots, N_T-1; k=t+1, \ldots, N_T$), may be selected to determine the phase $\Theta_1, \Theta_2, \ldots, \Theta_{NT}$ of each of the transmitting antennas 104-1, 104-2, ..., 104-$N_T$.

For example, the $N_T-1$ expressions in Equation (16) including the phase $\theta_T$ of the transmitting antenna 104-$N_T$, respectively corresponding to the $N_T-1$ values $h^*_t h_{N_T}$ ($t=1, \ldots, N_T-1$), may be selected to determine the phase $\Theta_1$, $\Theta_2, \ldots, \Theta_{NT}$ of each of the transmitting antennas 104-1, 104-2, . . . , 104-$N_T$. In other words, the transmitting antennas 104-1, 104-2, . . . , 104-$N_T$–1 each are co-phased with the transmitting antenna 104-$N_T$. In some embodiments of the present invention, a phase value zero is assigned to the phase $\Theta_{NT}$ of the transmitting antenna 104-$N_T$. Accordingly, the phase $\Theta_1, \Theta_2, \ldots, \Theta_{NT}$ of each of the transmitting antennas 104-1, 104-2, . . . , 104-$N_T$ may be determined as follows:

$$\theta_t = \begin{cases} 0 & \text{for } t = N_T \\ \angle(h_t^* h_{N_T}) & \text{for } t = 1, \cdots, N_T - 1 \end{cases}. \quad \text{Equation (27)}$$

In some embodiments of the present invention, an ordering-based pairwise co-phasing method may be used to determine the phase $\Theta_1, \Theta_2, \ldots, \Theta_{NT}$ of each of the transmitting antennas 104-1, 104-2, . . . , 104-$N_T$. Based on the ordering-based pairwise co-phasing method, the expressions in Equation (16) corresponding to the values $h_t^* h_k$ that have a relatively large magnitude may be used to determine the phase $\Theta_1, \Theta_2, \ldots, \Theta_{NT}$ of each of the transmitting antennas 104-1, 104-2, . . . , 104-$N_T$.

Figure 3:
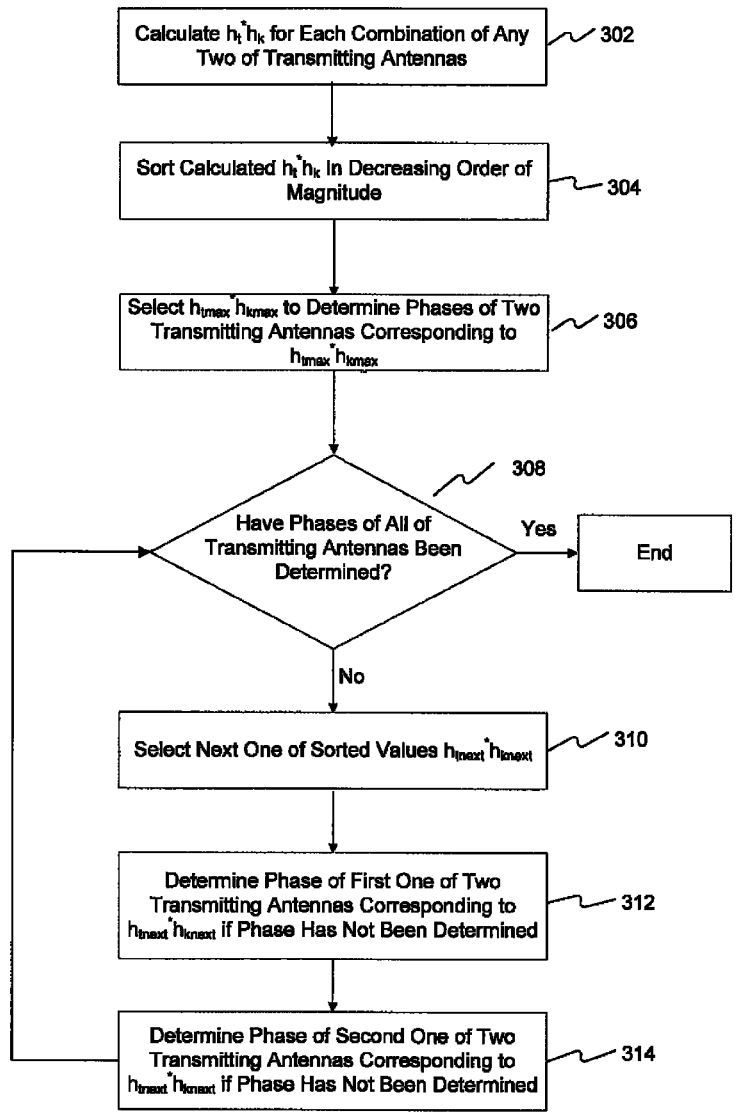
FIG. 3 illustrates a flowchart of an ordering-based pairwise co-phasing method to determine a phase of each of a plurality of transmitting antennas in a MIMO system according to some embodiments of the present invention.

FIG. 3 illustrates a flowchart of the ordering-based pairwise co-phasing method according to some embodiments of the present invention. In step 302, for each combination of any two (104-t and 104-k) of the transmitting antennas 104-1, 104-2, . . . , 104-$N_T$, the value $h_t^* h_k$ is calculated. In step 304, the values $h_t^* h_k$ (t=1, . . . , $N_T$–1; k=t+1, . . . , $N_T$) are sorted in a decreasing order of magnitude. In step 306, one of the sorted values $h^*_{tmax} h_{kmax}$ that has the largest magnitude is selected to determine the phases of the two transmitting antennas 104-tmax and 104-kmax corresponding to the selected value.

In step 308, a judgment is made whether the phases of all of the transmitting antennas 104-1, 104-2, . . . , 104-$N_T$ have been determined. A next one of the sorted values $h^*_{tnext} h_{knext}$ is selected in step 310 if the phases of all of the transmitting antennas 104-1, 104-2, . . . , 104-$N_T$ have not been determined. Based on the selected next value $h^*_{tnext} h_{knext}$, in step 312 the phase of a first one of the two transmitting antennas 104-tnext and 104-knext corresponding to the selected next value $h^*_{tnext} h_{knext}$ may be determined if the phase of the first one of the two transmitting antennas 104-tnext and 104-knext has not been determined. Also, based on the selected next value $h^*_{tnext} h_{knext}$, in step 314 the phase of a second one of the two transmitting antennas 104-tnext and 104-knext corresponding to the selected next value $h^*_{tnext} h_{knext}$ may be determined if the phase of the second one of the two transmitting antennas 104-tnext and 104-knext has not been determined. Steps 308 to 314 are repeated until the phases of all of the transmitting antennas 104-1, 104-2, . . . , 104-$N_T$ have been determined.

For example, for the MIMO system 100 having a total of three transmitting antennas 104-1, 104-2, and 104-3, Equation (16) can be expressed as:

$\theta_1 - \theta_2 = \angle(h^*_1 h_2)$, $\theta_1 - \theta_3 = \angle(h^*_1 h_3)$, $\theta_2 - \theta_3 = \angle(h^*_2 h_3)$. \quad Equation (28)

The values $h^*_1 h_2$, $h^*_1 h_3$, and $h^*_2 h_3$ are calculated and sorted in a decreasing order of magnitude. In some embodiments of the present invention, the magnitude of $h^*_1 h_2$ is smaller than the magnitude of $h^*_1 h_3$, which is further smaller than the magnitude of $h^*_2 h_3$. Therefore, after sorting, the values $h^*_1 h_2$, $h^*_1 h_3$, and $h^*_2 h_3$ would be presented as $h_2 h_3$, $h^*_1 h_3$, and $h^*_1 h_2$. Accordingly, the expressions in Equation (28) can be reordered as follows:

$\theta_2 - \theta_3 = \angle(h^*_2 h_3)$, $\theta_1 - \theta_3 = \angle(h^*_1 h_3)$, $\theta_1 - \theta_2 = \angle(h^*_1 h_2)$. \quad Equation (29)

The value $h^*_2 h_3$ having the largest magnitude is selected to determine the phases of the transmitting antennas 104-2 and 104-3 corresponding to the value $h^*_2 h_3$. For example, the phase $\Theta_3$ of the transmitting antenna 104-3 may be determined by assigning a phase value zero to the phase $\Theta_3$. The phase $\Theta_2$ of the transmitting antenna 104-2 may be determined based on the determined phase $\Theta_3$ and the value $h^*_2 h_3$ using Equation (29), i.e., $\theta_2 = 0 + \angle(h^*_2 h_3) = \angle(h^*_2 h_3)$.

Next, a judgment is made whether the phases of all of the transmitting antennas 104-1, 104-2, and 104-3 have been determined. Here, the phase $\Theta_1$ of the transmitting antenna 104-1 has not been determined, and therefore a next one of the sorted values $h^*_1 h_3$, corresponding to the transmitting antennas 104-1 and 104-3, is selected. Because the phase $\Theta_3$ of the transmitting antenna 104-3 has been determined but the phase $\Theta_1$ of the transmitting antenna 104-1 has not been determined, the phase $\Theta_1$ may be determined based on the determined phase $\Theta_3$ and the value $h^*_1 h_3$ using Equation (29), i.e., $\theta_1 = \theta_2 + \angle(h^*_1 h_3) = \angle(h^*_2 h_3) + \angle(h^*_1 h_3)$. Thus, the phases of all of the transmitting antennas 104-1, 104-2, and 104-3 have been determined.

C. Cumulative Co-Phasing

In some embodiments of the present invention, a cumulative co-phasing method may be used to determine the phase $\Theta_1, \Theta_2, \ldots, \Theta_{NT}$ of each of the transmitting antennas 104-1, 104-2, . . . , 104-$N_T$. Referring back to Equation (15), Equation (15) can also be written as follows:

$$f(\theta_1, \theta_2, \ldots, \theta_{N_T}) = \sum_{t=1}^{N_T} R\left\{ e^{-j\theta_t} \sum_{k=t+1}^{N_T} e^{j\theta_k} (h_t^* h_k) \right\}. \quad \text{Equation (30)}$$

As noted above, the SNR of the obtained signal r may be improved by determining the phases $\Theta_1, \Theta_2, \ldots, \Theta_{NT}$ such that the function $f(\Theta_1, \Theta_2, \ldots, \Theta_{NT})$ may be maximized. Here, based on Equation (30), it is possible to maximize the function $f(\Theta_1, \Theta_2, \ldots, \Theta_{NT})$ if the phase $\Theta_t$ (t=1, . . . , $N_T$) of the transmitting antenna 104-t is determined as follows:

$$\theta_t = \angle\left( \sum_{k=t+1}^{N_T} e^{j\theta_k} (h_t^* h_k) \right) = \angle\left( h_t^* \sum_{k=t+1}^{N_T} e^{j\theta_k} h_k \right). \quad \text{Equation (31)}$$

For example, the phase $\Theta_{NT}$ of the transmitting antenna 104-$N_T$ may be determined by assigning a phase value, e.g., zero, to the phase $\Theta_{NT}$. Based on Equation (31), the phase $\Theta_{NT-1}$ of the transmitting antenna 104-$N_T$–1 may be determined. The determined phases $\Theta_{NT-1}$ of the transmitting antenna 104-$N_T$–1 and $\Theta_{NT}$ of the transmitting antenna 104-$N_T$ may be further used to determine the phase $\Theta_{NT-2}$ of the transmitting antenna 104-$N_T$–2, again, based on Equation (31). Similarly, based on Equation (31), the phase $\Theta_t$ (t=1, . . . , $N_T$–3) of the transmitting antenna 104-t may be determined by the phases $\Theta_{t+1}$, $\Theta_{t+2}$, ..., $\Theta_{N_T}$ of the transmitting antennas 104-t+1, 104-t+2, ..., 104-$N_T$. In other words, the transmitting antenna 104-t (t=1, ..., $N_T$−1) may be approximately co-phased with the transmitting antenna(s) 104-t+1, 104-t+2, ..., 104-$N_T$.

Figure 4:
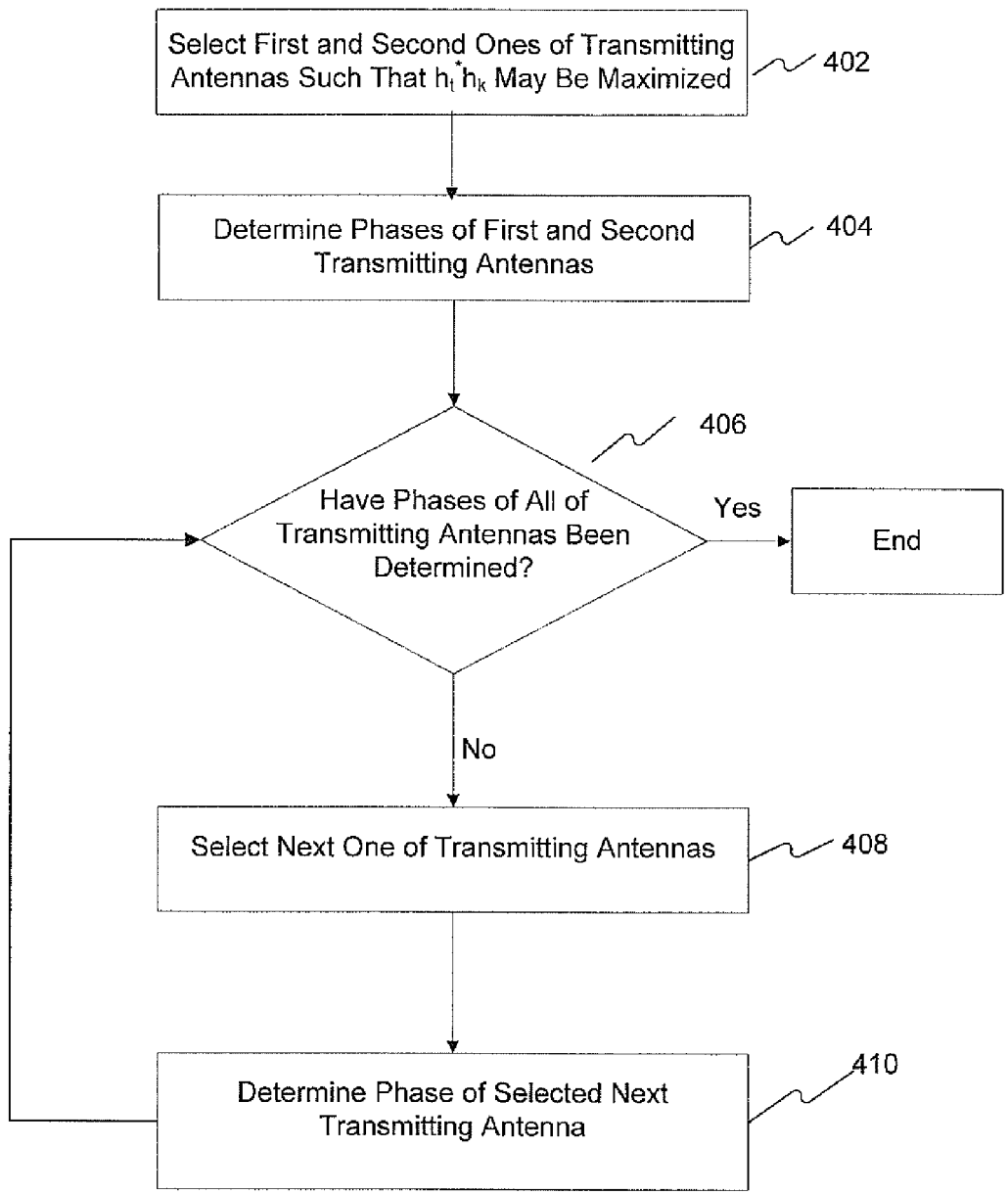
FIG. 4 illustrates a flowchart of an ordering-based cumulative co-phasing method to determine a phase of each of a plurality of transmitting antennas in a MIMO system according to some embodiments of the present invention.

FIG. 4 illustrates a flowchart of an ordering-based cumulative co-phasing method, according to some embodiments of the present invention. In step 402 of FIG. 4, first and second ones (e.g., 104-t1 and 104-t2) of the transmitting antennas 104-1, 104-2, ..., 104-$N_T$ are selected such that the magnitude of the value h*$_t$h$_k$ (t=1, ..., $N_T$−1; k=t+1, ..., $N_T$) may be maximized when t=t2 and k=t1. For example, for each combination of any two of the transmitting antennas 104-t and 104-k (t=1, ..., $N_T$−1; k=t+1, ..., $N_T$), the value h*$_t$h$_k$ may be calculated. The transmitting antennas 104-t1 and 104-t2 corresponding to the value h*$_{t2}$h$_{t1}$ that has a largest magnitude among the values h*$_t$h$_k$ (t=1, ..., $N_T$−1; k=t+1, ..., $N_T$) are selected.

Based on the value h*$_{t2}$h$_{t1}$, in step 404 the phases $\Theta_{t1}$ and $\Theta_{t2}$ of the selected transmitting antennas 104-t1 and 104-t2 are determined. For example, the phase $\Theta_{t1}$ of the transmitting antennas 104-t1 may be determined by assigning a phase value zero to $\Theta_{t1}$. The phase $\Theta_{t2}$ of the transmitting antennas 104-t2 may then be determined based on the determined phase $\Theta_{t1}$ of the transmitting antennas 104-t1, the value h*$_{t2}$h$_{t1}$, and Equation (31).

Next, in step 406 a judgment is made whether the phases $\Theta_1$, $\Theta_2$, ..., $\Theta_{NT}$ of all of the transmitting antennas 104-1, 104-2, ..., 104-$N_T$ have been determined. If the phases $\Theta_1$, $\Theta_2$, ..., $\Theta_{NT}$ of all of the transmitting antennas 104-1, 104-2, ..., 104-$N_T$ have not been determined, a next transmitting antenna 104-t$_n$ (n−1 is the number of the transmitting antennas whose phases have been determined) is selected from ones of the transmitting antennas 104-1, 104-2, ..., 104-$N_T$ whose phases have not been determined in step 408. That selection is made such that the magnitude of the value $$h_t^* \left( \sum_{k=1}^{n-1} e^{j\theta_{t_k}} h_{t_k} \right)$$

may be maximized when t=t$_n$, where t is the index of one of the transmitting antennas 104-1, 104-2, ..., 104-$N_T$ whose phases have not been determined, and t$_k$ (k=1, 2, ..., n−1) is the indexes of all of the transmitting antennas 104-1, 104-2, ..., 104-$N_T$ whose phases have been determined. In step 410, the phase of the selected next transmitting antenna 104-t$_n$ is determined. For example, for each of the ones of the transmitting antennas 104-1, 104-2, ..., 104-$N_T$ whose phases have not been determined, the value $$h_t^* \left( \sum_{k=1}^{n-1} e^{j\theta_{t_k}} h_{t_k} \right)$$

may be calculated. The transmitting antenna 104-t$_n$ corresponding to the value $$h_{t_n}^* \left( \sum_{k=1}^{n-1} e^{j\theta_{t_k}} h_{t_k} \right)$$

that has a largest magnitude among the values $$h_t^* \left( \sum_{k=1}^{n-1} e^{j\theta_{t_k}} h_{t_k} \right)$$

is selected. The phase $\Theta_m$ of the selected transmitting antennas 104-t$_n$ is substantively equal to the phase of the value $$h_{t_n}^* \left( \sum_{k=1}^{n-1} e^{j\theta_{t_k}} h_{t_k} \right),$$

as shown in Equation (31). Steps 406 to 410 are repeated until the phases of all of the transmitting antennas 104-1, 104-2, ..., 104-$N_T$ have been determined.

D. Iterative Co-Phasing

In some embodiments of the present invention, an iterative co-phasing method may be used to determine the phase $\Theta_1$, $\Theta_2$, ..., $\Theta_{NT}$ of each of the transmitting antennas 104-1, 104-2, ..., 104-$N_T$. Referring back to Equation (15), Equation (15) can also be written as follows:

$$f(\theta_1, \theta_2, \ldots, \theta_{N_T}) = \qquad \text{Equation (32)}$$
$$R\left\{ e^{-j\theta_1} \sum_{k=2}^{N_T} e^{j\theta_k} (h_1^* h_k) \right\} + \sum_{t=2}^{N_T} R\left\{ e^{-j\theta_t} \sum_{k=t+1}^{N_T} e^{j\theta_k} (h_t^* h_k) \right\}.$$

The second term $$\sum_{t=2}^{N_T} R\left\{ e^{-j\theta_t} \sum_{k=t+1}^{N_T} e^{j\theta_k} (h_t^* h_k) \right\}$$

in Equation (32) does not depend on $\Theta_1$. In general, Equation (15) can further be written as follows:

$$f(\theta_1, \theta_2, \ldots, \theta_{N_T}) = R\left\{ e^{-j\theta_t} \sum_{k=1, k \neq t}^{N_T} e^{j\theta_k} h_t^* h_k \right\} + c_t, \qquad \text{Equation (33)}$$

where c$_t$ does not depend on $\Theta_t$. As noted above, the SNR of the obtained signal r may be improved by determining the phases $\Theta_1$, $\Theta_2$, ..., $\Theta_{NT}$ such that the function f($\Theta_1$, $\Theta_2$, ..., $\Theta_{NT}$) may be maximized. Here, for given $N_T$−1 of the $N_T$ phases $\Theta_1$, $\Theta_2$, ..., $\Theta_{NT}$ excluding the phase $\Theta_t$, it is possible to maximize the function f($\Theta_1$, $\Theta_2$, ..., $\Theta_{NT}$) by determining the phase $\Theta_t$ such that the first term $$R\left\{ e^{-j\theta_t} \sum_{k=1, k \neq t}^{N_T} e^{j\theta_k} h_t^* h_k \right\}$$

on the right side of Equation (33) may be maximized. Accordingly, the phase $\Theta_t$ may be determined as follows:

$$\theta_t = \angle\left(\sum_{k=1,k\neq t}^{N_T} e^{j\theta_k} h_t^* h_k\right).$$ Equation (34)

Figure 5:
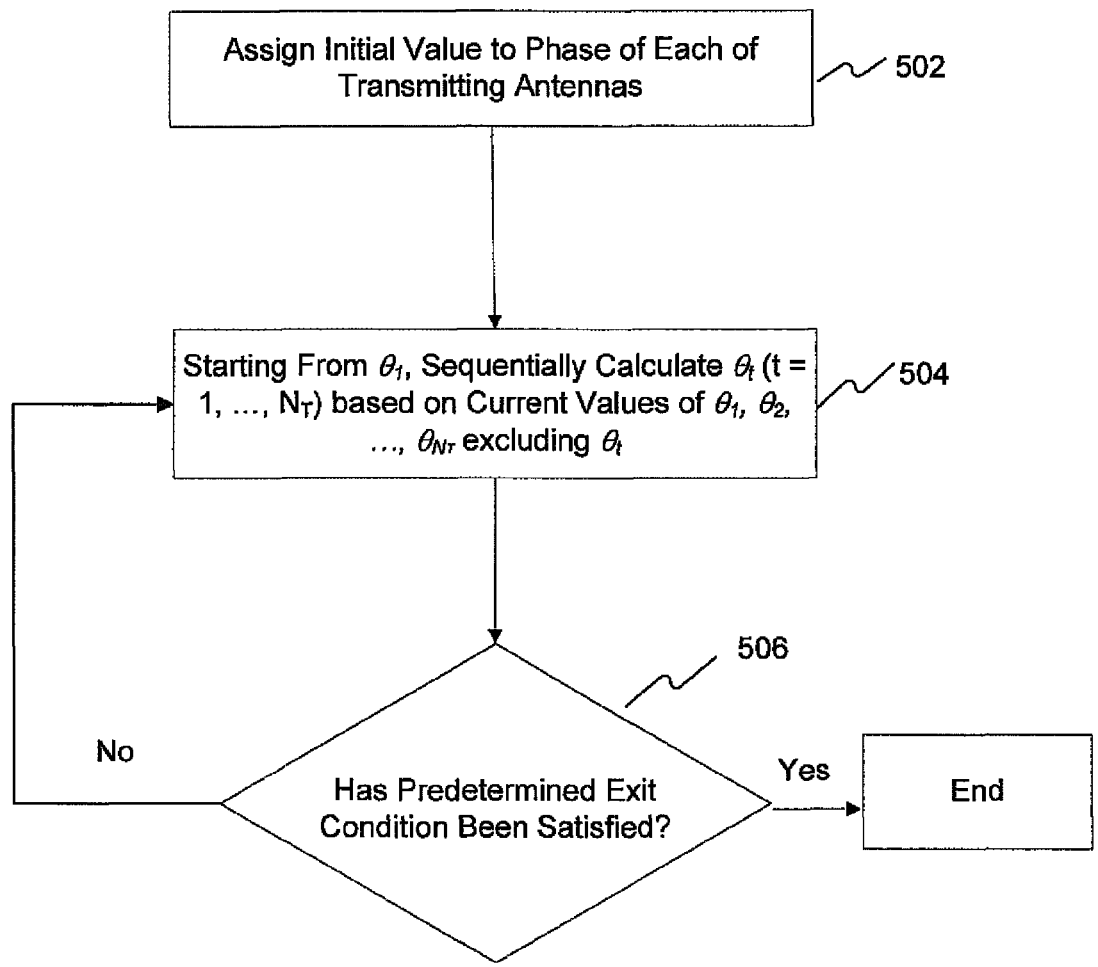
FIG. 5 illustrates a flowchart of an iterative co-phasing method to determine a phase of each of a plurality of transmitting antennas in a MIMO system according to some embodiments of the present invention.

In some embodiments of the present invention, in step 502 of FIG. 5, the phases $\Theta_1, \Theta_2, \ldots, \Theta_{N_T}$ each are assigned an initial value, e.g., zero. Therefore each of the phases $\Theta_1, \Theta_2, \ldots, \Theta_{N_T}$ has a current value zero. Then starting from the phase $\Theta_1$, in step 504 the phase $\Theta_t$ (t=1, ..., $N_T$) may be sequentially calculated based on current values of the phases $\Theta_1, \Theta_2, \ldots, \Theta_{N_T}$ excluding $\Theta_t$, using Equation (34). Each time the phase $\Theta_t$ (t=1, ..., $N_T$) is calculated using Equation (34), the current value of the phase $\Theta_t$ is updated, which constitutes one iteration. In step 506, a judgment is then made whether a predetermined exit condition has been satisfied. For example, the predetermined exit condition may be whether the calculated phase $\Theta_t$ (t=1, ..., $N_T$) has converged. Also, for example, the predetermined exit condition may be whether steps 504 and 506 have been repeated for a prescribed number of iterations. Steps 504 and 506 are repeated until the predetermined exit condition has been satisfied. When the predetermined exit condition has been satisfied, the phases $\Theta_1, \Theta_2, \ldots, \Theta_{N_T}$ of the transmitting antennas 104-1, 104-2, ..., 104-$N_T$ have been determined.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method comprising:
calculating a plurality of values based on a first group of channel gains and a second group of channel gains in a multiple input and multiple output (MIMO) communication system, wherein the first group corresponds to channel gains between a first of a plurality of transmitting antennas and each of a plurality of receiving antennas and the second group corresponds to channel gains between a second of the plurality of transmitting antennas and each of the plurality of receiving antennas, and
evaluating a respective phase for each of the plurality of transmitting antennas based on the plurality of values.

2. The method of claim 1, wherein calculating the plurality of values comprises:
multiplying i) a conjugate of the first group of channel gains with ii) the second group of channel gains to calculate the plurality of values; and
summing each of the plurality of values to generate a gain value for the first of the plurality of transmitting antennas and the second of the plurality of transmitting antennas, wherein evaluating a respective phase for each of the plurality of transmitting antennas is based on at least the gain value.

3. The method of claim 1, wherein evaluating a respective phase for each of the plurality of transmitting antennas comprises:
evaluating a first phase of the first of the plurality of transmitting antennas and a second phase of the second of the plurality of transmitting antennas based on the plurality of values;
determining whether a respective phase of each of the plurality of transmitting antennas has been evaluated;
selecting a third of the plurality of transmitting antennas if the respective phase of each of the plurality of transmitting antennas has not been evaluated; and
evaluating the respective phase of the selected third of the plurality of transmitting antennas based on a third group of channel gains, wherein the third group corresponds to channel gains between the selected third of the plurality of transmitting antennas and each of the plurality of receiving antennas.

4. The method of claim 1, wherein evaluating a respective phase for each of the plurality of transmitting antennas comprises:
sorting the plurality of values based on a respective magnitude of each of the plurality of values, such that a first value of the sorted plurality of values has a largest magnitude;
selecting the first value of the sorted plurality of values;
evaluating, based on the selected first value, a first phase of the first of the plurality of transmitting antennas and a second phase of the second of the plurality of transmitting antennas, wherein the first phase and the second phase correspond to the selected first value;
determining whether a respective phase for each of the plurality of transmitting antennas has been evaluated;
selecting a second value of the sorted plurality of values if the respective phase of each of the plurality of transmitting antennas has not been evaluated;
evaluating, based on the selected second value, the first phase of the first of the plurality of transmitting antennas corresponding to the selected second value, if the first phase of the first of the plurality of transmitting antennas has not been determined; and
evaluating, based on the selected second value, the second phase of the second of the plurality of transmitting antennas corresponding to the selected second value, if the second phase of the second of the plurality of transmitting antennas has not been determined.

5. The method of claim 1, wherein evaluating a respective phase for each of the plurality of transmitting antennas comprises:
assigning a first current value to a first phase of the first of the plurality of transmitting antennas and a second current value to a second phase of the second of the plurality of transmitting antennas;
selecting the first of the plurality of transmitting antennas and updating the first current value of the first phase of the first of the plurality of transmitting antennas;
determining whether a predetermined condition has been satisfied; and
selecting the second of the plurality of transmitting antennas and updating the second current value if the predetermined condition has not been satisfied.

6. The method of claim 5, wherein updating the first current value comprises:

calculating, for each of the plurality of transmitting antennas excluding the first of the plurality of transmitting antennas, a respective gain value based on the first group of channel gains;

summing the respective gain values calculated for each of the plurality of transmitting antennas excluding the first to generate a result; and updating, with the result, the first current value of the first phase of the first of the plurality of transmitting antennas.

7. A system comprising control circuitry configured to:

calculating a plurality of values based on a first group of channel gains and a second group of channel gains in a multiple input and multiple output (MIMO) communication system, wherein the first group corresponds to channel gains between a first of a plurality of transmitting antennas and each of a plurality of receiving antennas and the second group corresponds to channel gains between a second of the plurality of transmitting antennas and each of the plurality of receiving antennas, and evaluate a respective phase for each of the plurality of transmitting antennas based on the plurality of values.

8. The system of claim 7, wherein the control circuitry is further configured to:

calculate a plurality of values by multiplying i) a conjugate of the first group of channel gains with ii) the second group of channel gains to calculate the plurality of values; and sum each of the plurality of values to generate a gain value for the first of the plurality of transmitting antennas and the second of the plurality of transmitting antennas, wherein evaluating a respective phase for each of the plurality of transmitting antennas is based on at least the gain value.

9. The system of claim 7, wherein the control circuitry is further configured to:

evaluate a first phase of the first of the plurality of transmitting antennas and a second phase of the second of the plurality of transmitting antennas based on the plurality of values;

determine whether a respective phase of each of the plurality of transmitting antennas has been evaluated;

select a third of the plurality of transmitting antennas if the respective phase of each of the plurality of transmitting antennas has not been evaluated; and evaluating the respective phase of the selected third of the plurality of transmitting antennas based on a third group of channel gains, wherein the third group corresponds to channel gains between the selected third of the plurality of transmitting antennas and each of the plurality of receiving antennas.

10. The system of claim 7, wherein the control circuitry is further configured to:

sort the plurality of values based on a respective magnitude of each of the plurality of values, such that a first value of the sorted plurality of values has a largest magnitude;

select the first value of the sorted plurality of values;

evaluate, based on the selected first value, a first phase of the first of the plurality of transmitting antennas and a second phase of the second of the plurality of transmitting antennas, wherein the first phase and the second phase correspond to the selected first value;

determine whether a respective phase for each of the plurality of transmitting antennas has been evaluated;

select a second value of the sorted plurality of values if the respective phase of each of the plurality of transmitting antennas has not been evaluated;

evaluate, based on the selected second value, the second phase of the first of the plurality of transmitting antennas corresponding to the selected second value, if the first phase of the first of the plurality of transmitting antennas has not been determined; and evaluate, based on the selected second value, the second phase of the second of the plurality of transmitting antennas corresponding to the selected second value, if the second phase of the second of the plurality of transmitting antennas has not been determined.

11. The system of claim 7, wherein the control circuitry is further configured to:

assign a first current value to a first phase of the first of the plurality of transmitting antennas and a second current value to a second phase of the second of the plurality of transmitting antennas;

select the first of the plurality of transmitting antennas and updating the first current value of the first phase of the first of the plurality of transmitting antennas;

determining whether a predetermined condition has been satisfied; and selecting the second of the plurality of transmitting antennas and updating the second current value if the predetermined condition has not been satisfied.

12. The system of claim 11, wherein the control circuitry is further configured to:

calculate, for each of the plurality of transmitting antennas excluding the first of the plurality of transmitting antennas, a respective gain value based on the first group of channel gains;

summing the respective gain values calculated for each of the plurality of transmitting antennas excluding the first to generate a result; and update, with the result, the first current value of the first phase of the first of the plurality of transmitting antennas.

13. The method of claim 1, wherein each of the plurality of transmitting antennas respectively has a transmitting power, and wherein a respective phase for each of the plurality of transmitting antennas is evaluated independently from the transmitting power of the respective one of the plurality of transmitting antennas.

14. The system of claim 7, wherein each of the plurality of transmitting antennas respectively has a transmitting power, and wherein a respective phase for each of the plurality of transmitting antennas is evaluated independently from the transmitting power of the respective one of the plurality of transmitting antennas.

15. The method of claim 1, wherein each of the plurality of values is a complex number and evaluating the respective phase for each of the plurality of transmitting antennas comprises computing a respective angle for each of the plurality of values.

16. The system of claim 7, wherein each of the plurality of values is a complex number and the respective phase for each of the plurality of transmitting antennas is evaluated by computing a respective angle for each of the plurality of values.

17. The method of claim 1, further comprising evaluating a respective weight associated with each of the plurality of values.

18. The system of claim 7, wherein the control circuitry is further configured to evaluate a respective weight associated with each of the plurality of values.

19. The method of claim 17, wherein the respective weight is a function of a magnitude of one of the plurality of values.

20. The system of claim 18, wherein the respective weight is a function of a magnitude of one of the plurality of values.

* * * * *